March 25, 1941.  P. DODGE  2,236,424
AIR BRAKE
Filed June 6, 1940
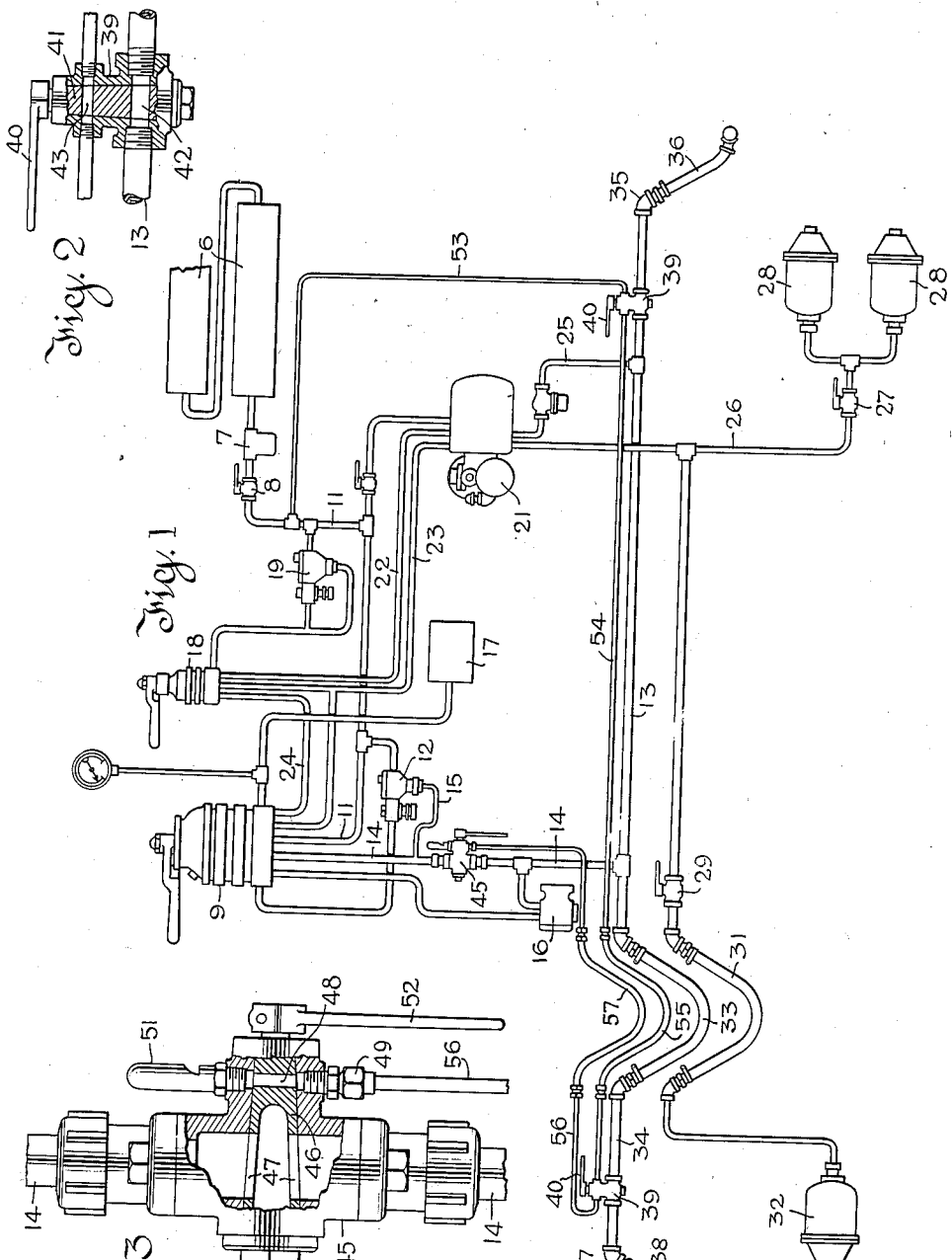
Inventor
Parker Dodge
By
Dodge and Ims
Attorneys Patented Mar. 25, 1941

2,236,424

UNITED STATES PATENT OFFICE 2,236,424

AIR BRAKE

Parker Dodge, Chevy Chase, Md., assignor to The New York Air Brake Company, a corporation of New Jersey Application June 6, 1940, Serial No. 339,200

4 Claims. (Cl. 303—14)

This invention relates to air brakes and particularly to connections for double heading cocks of the safety type.

In double heading, control is exercised by the engineer's brake valve on the leading engine. On the second or any succeeding engine the double heading cock, between the engineer's brake valve and the brake pipe, should be closed.

There has recently been developed by applicant's assignee a safety type double heading cock designed to be energized if the cock is open when that part of the locomotive brake pipe forward of the forward brake pipe stop cock is under pressure. That part of the brake pipe is under pressure on the second locomotive of a double headed train but not on the leading locomotive. The safety double heading cock may be of either of two types, one of which includes a warning whistle port open when the double heading cock is open, and the other of which includes a pressure motor which is connected to close the cock, and operates when subjected to pressure if the cock is then open. The present invention may be used with either type of cock and the whistle port type will be illustrated as typical, the principle being unaffected by the type of cock.

In the rare case when it is desired to connect a locomotive to a train with the locomotive "rear end to," the scheme outlined above occasions some difficulty.

The present invention is based on the fact that on a leading locomotive one brake pipe stop cock ("angle cock") at one or the other end of the locomotive is always closed, whereas on the second locomotive and any succeeding locomotive of a multiple header, both such stop cocks (angle cocks) must be open.

Hence air is furnished to the whistle port (or motor port) of a safety double heading cock serially through two auxiliary ports, one in each of the two angle cocks, each auxiliary port being so arranged as to be open when the main cock port is open, and closed when the latter is closed. Thus if the double heading cock is open when both angle cocks are open, the safety cock is energized; i. e. in the whistle type the warning whistle blows. All three cocks must be open at the same time or the whistle cannot blow.

A simple embodiment of the invention will now be described by reference to the accompanying drawing, in which:

Fig. 1 is a diagram of the equipment for one locomotive with the invention applied;

Fig. 2 is an axial section of a special double ported brake pipe stop cock; and

Fig. 3 is a vertical axial section of a safety double heading cock of the whistle port type.

Referring first to Fig. 1, the components of the standard brake equipment will first be identified.

The main reservoirs 6, charged by a compressor (not shown) deliver air through the main filter 7 and normally open stop cock 8 to the entire brake system. There is an engineer's brake valve 9, assumed to be of the H–6 type, which has a main reservoir air connection 11 and a feed valve connection through the feed valve 12. The brake pipe is shown at 13, and the branch pipe leading from the engineer's brake valve 9 to the brake pipe is indicated at 14. The double heading cock, hereafter identified and described, is as usual interposed in the pipe 14 between the engineer's brake valve 9 and the brake pipe 13. The connection 15 is simply a pressure transmitting connection to the pressure responsive element of the feed valve.

An ordinary emergency vent valve is indicated at 16. The equalizing reservoir is shown at 17. The independent brake valve appears at 18 and is supplied from the main reservoirs by a feed valve 19. The distributing valve appears at 21 and has a supply connection from the main reservoir air supply line 11.

The pipes 22 and 23 are, respectively, the release pipe and the application cylinder pipe. The connection 24, between the engineer's brake valve and the independent brake valve, is the well known U pipe. The brake pipe branch leading to the distributing valve is indicated at 25. There is a pipe 26 which leads through a normally open cut out cock 27 to the engine brake cylinders 28. A branch of pipe 26 leads through a normally open cock 29 and hose 31 to the tender brake cylinder 32. The rear end of the brake pipe 13 on the locomotive is connected by a hose 33 with the tender brake pipe 34.

At the forward end of the locomotive brake pipe 13 is an angle fitting 35 with hose 36 and at the rear end of the tender brake pipe 34 is an angle fitting 37 with hose 38.

Near the fittings 35 and 37 are identical stop cocks generally indicated by the numeral 39 applied to the cock bodies. One such cock is shown in detail in Fig. 2.

Referring to Fig. 2, cock 39 has a rotary plug 41 having a main port 42 controlling flow through brake pipe 13, or 34, as the case may be, and an auxiliary port 43 which controls a wholly distinct flow path, open when the related brake pipe port 42 is open, and closed when the brake pipe port is closed. The cock is operated by a handle 40.

Interposed in branch 14, between engineer's brake valve 9 and brake pipe 13 is the safety double heading cock whose body is indicated at 45 in Fig. 1. The internal construction of one type of safety double heading cock is shown in Fig. 3. This is one of several known constructions invented by another.

In body 45 is a conical cock plug 46 with main through port 47 controlling flow through branch pipe 14. There is a parallel auxiliary port 48 controlling flow from connection 49 to whistle 51. The cock is operated by handle 52. When port 47 opens branch pipe 14, port 48 connects the whistle with connection 49. When one port is closed both are closed.

A pipe 53 leads from main reservoir pipe 11 (which typifies any available source of compressed air) to an auxiliary flow connection of one cock 39. From the other auxiliary flow connection of this cock 39 a pipe 54 leads to an auxiliary flow connection of the other cock 39, a hose 55 being used between engine and tender as shown. From the other auxiliary flow connection of the second cock 39 a pipe 56, with hose 57, leads to connection 49 in the double heading cock.

Hence, whenever both cocks 39 are open, air under pressure is supplied to connection 49. This condition exists only in the second engine of a double header. If the double heading cock be then open, whistle 51 will blow and warn the engineer to close the double heading cock.

The scheme may be used with any type of safety double heading cock capable of being energized by the supply of compressed air thereto. The series connection of auxiliary passages in the two brake pipe stop cocks affords means directly indicative of the position of the engine either as lead engine, or as the following engine of a double header.

I claim:

1. In an automatic air brake system, locomotive brake equipment comprising a brake pipe; an engineer's brake valve normally connected to control pressure in said brake pipe; a double heading cock controlling the connection between said engineer's brake valve and said brake pipe; two stops cocks, one for closing each end of the brake pipe; and protective means controlled by the simultaneous positions of said three cocks and effective when said three cocks are simultaneously open and ineffective if any one is closed.

2. The combination defined in claim 1 in which the protective means comprises a source of air under pressure, an air operated signal and an auxiliary passage opened serially through said cocks from said source to said signal in the open positions of the cocks.

3. In an automatic air brake system, locomotive brake equipment comprising in combination, a brake pipe extending from end to end of the locomotive and provided at its ends with means for connecting with other brake pipe units; stop cocks controlling the brake pipe near its opposite ends, said stop cocks including auxiliary passages and serving to open and close the same in definite relation to the opening and closing of the brake pipe; an engineer's brake valve connected by a branch with said brake pipe at a point intermediate said stop cocks; a double heading cock controlling said branch; fluid pressure operated protective means associated with said double heading cock and conditioned to operate by movement of the double heading cock to position for use in a leading engine; and a connection controlled by said auxiliary passages for supplying pressure fluid to said protective means only when said stop cocks are simultaneously in the position required on the second locomotive of a double header.

4. In an automatic air brake system the combination with a locomotive brake equipment comprising a brake pipe, an engineer's brake valve normally connected to control the pressure in said brake pipe, a normally open double heading cock operable to interrupt the connection between the brake valve and the brake pipe, and stop cocks at opposite ends of the brake pipe; of a protective mechanism comprising a source of air under pressure; auxiliary ports in said stop cocks so arranged that an auxiliary passage is opened from said source of air when the related cocks are open; and an air operated protective device conditioned to operate when the double heading cock is in normal position, and connected to be supplied with air by said auxiliary passage.

PARKER DODGE.